US009710772B1

(12) United States Patent
Kelly et al.

(10) Patent No.: US 9,710,772 B1
(45) Date of Patent: Jul. 18, 2017

(54) USING SENSOR DATA TO MODIFY ATTRIBUTES OF INFORMATION PRESENTED TO A USER

(71) Applicant: Amazon Technologies, Inc., Reno, NV (US)

(72) Inventors: Justin David Kelly, Seattle, WA (US); Wesley Scott Lauka, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 470 days.

(21) Appl. No.: 14/298,467

(22) Filed: Jun. 6, 2014

(51) Int. Cl.
*G06Q 10/06* (2012.01)
*G08B 21/18* (2006.01)

(52) U.S. Cl.
CPC ....... *G06Q 10/06316* (2013.01); *G08B 21/18* (2013.01)

(58) Field of Classification Search
CPC ........ G06Q 10/00; G06Q 40/00; G06Q 40/06; G06Q 10/06316; G06F 17/60
USPC ........................................................ 705/7.26
See application file for complete search history.

(56) References Cited

U.S. PATENT DOCUMENTS

| | | | | |
|---|---|---|---|---|
| 6,067,584 A * | 5/2000 | Hayles et al. | ............ | G06F 9/44 702/127 |
| 7,487,112 B2 * | 2/2009 | Barnes, Jr. | ............. | G06Q 10/02 705/26.8 |
| 8,694,366 B2 * | 4/2014 | Barnes, Jr. | ......... | G06Q 10/1053 705/14.1 |
| 2003/0220835 A1 * | 11/2003 | Barnes, Jr. | ......... | G06Q 10/1053 705/14.36 |
| 2005/0149578 A1 * | 7/2005 | Sustman et al. | ..... | G06F 11/1464 |
| 2007/0118426 A1 * | 5/2007 | Barnes, Jr. | ......... | G06Q 10/1053 379/114.13 |
| 2012/0095844 A1 * | 4/2012 | Barnes, Jr. | ......... | G06Q 10/1053 705/14.69 |
| 2013/0096966 A1 * | 4/2013 | Barnes, Jr. | ......... | G06Q 10/1053 705/5 |

* cited by examiner

*Primary Examiner* — Romain Jeanty
(74) *Attorney, Agent, or Firm* — Eversheds Sutherland (US) LLP

(57) ABSTRACT

Systems, methods, and computer-readable media are disclosed for determining a user's proximity to a reference location or a user's orientation in relation to an output device associated with the reference location and modifying one or more attributes of information presented to the user based on the detected proximity or orientation. The attributes that may be modified include, among other things, a size of visual information presented to the user, an intensity of audible or haptic information presented to the user, an orientation of the output device, and so forth. In addition, at least a portion of information initially presented to a user via a first output device may instead be presented to the user via a second output device based on the user's proximity to one or more reference locations, the user's orientation in relation to the first and second output devices, or attribute(s) of the user.

18 Claims, 5 Drawing Sheets

USING SENSOR DATA TO MODIFY ATTRIBUTES OF INFORMATION PRESENTED TO A USER

BACKGROUND

A workspace environment may include a variety of types of output devices configured to output information to assist workers in completing various tasks. Such information may include instructions, guidance information, or the like for assisting a worker in completing one or more tasks of a workflow process. As part of a typical workflow process, a worker may move between various locations within the workspace environment in order to complete various tasks. As a worker moves between different locations, the distance between the worker and an output device or the orientation of the worker with respect to the output device may repeatedly change which may, at times, make it difficult for the worker to detect information output from the output device.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
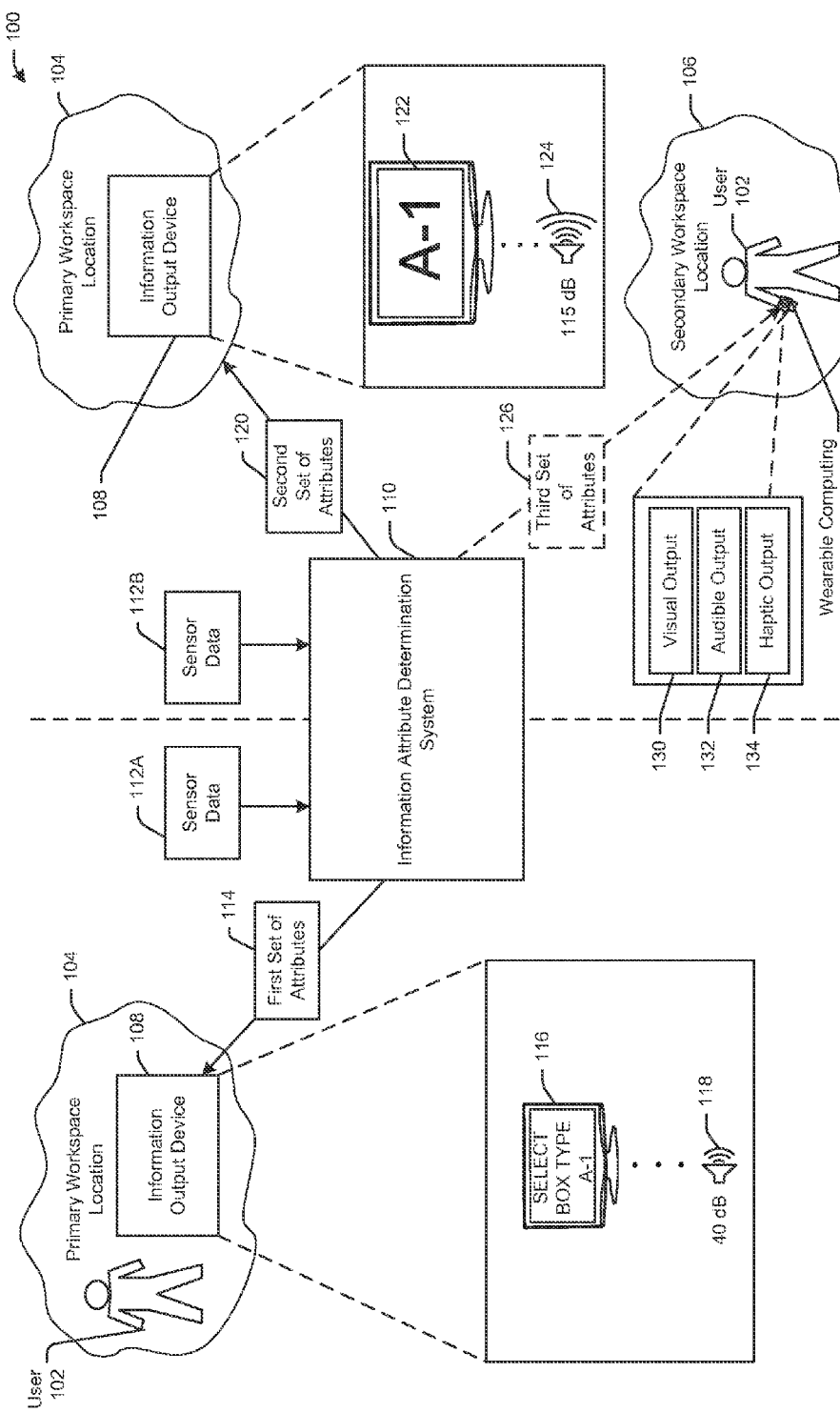
FIG. 1 is a schematic block diagram of an illustrative operational environment in accordance with one or more example embodiments of the disclosure.

This disclosure relates to, among other things, systems, methods, computer-readable media, techniques, and methodologies for modifying one or more attributes of information presented to a user based on an analysis of data gathered by one or more sensors. In accordance with example embodiments of the disclosure, sensor data may be analyzed to determine a metric indicative of a proximity of a user to a reference location or an orientation of the user in relation to an output device associated with the reference location. An updated set of attributes for information presented to the user may then be determined based at least in part on the determined metric, and the information presented to the user may be modified in accordance with the updated set of attributes. The attributes that may be updated may include, but are not limited to, a size of visual information, an intensity of audible or haptic information, an orientation of an output device, selection of a different output device to output information, or the like. In certain example embodiments, a first portion of information may be prioritized over a second portion of information based, for example, on a current stage of a workflow process, and a size or intensity of the first portion of the information may be increased relative to the second portion of information. The extent or degree of modification to information attributes may be a continuous or discrete function of the determined metric.

In an example embodiment of the disclosure, the metric may be a proximity metric indicative of a proximity of a user to a reference location. As a non-limiting example, the reference location may be a primary workspace location within a workspace environment. The user (e.g., a worker) may move between or among the primary workspace location and any number of secondary workspace locations in order to complete tasks of a workflow process.

Various types of information that assist the worker in performing tasks of the workflow process may be presented to the worker via an output device provided at the primary workspace location. For example, information may be displayed on a monitor, output from a speaker, and so forth. Depending on the particular task currently being performed, certain portions of the information presented to the worker may be more relevant than other portions. Assuming, for example, that the workflow process involves packing a product for shipment, one of the tasks of the process may be assembling the product packaging. In order to perform this task, a worker may need to leave the primary workspace location to retrieve the product packaging from a secondary workspace location. Among the various types of information presented to the worker via the output device at the primary workspace location, information that identifies that type of product packaging to retrieve may be most relevant to this current task. As the worker, however, moves away from the primary workspace location and towards the secondary workspace location, the information presented via the output device may become increasingly imperceptible to the worker because of the worker's distance from the output device.

Accordingly, as the worker moves away from the primary workspace location, a proximity metric that indicates the worker's proximity to, for example, the output device may be determined. A first portion of the information presented via the output device may then be prioritized over a second portion of the information, and attributes of the first portion of the information may be modified in relation to attributes of the second portion of the information. For example, if the current task involves retrieving the product packaging, a displayed size of the information that identifies the type of packaging may be increased relative to other information presented via the output device. Similarly, an intensity of audible output that identifies the type of packaging may be increased relative to other audible output. Also, in certain example scenarios, information may be presented in a new output form. For example, if the worker is at such a distance from the output device that an increase in the displayed size of relevant information would not be perceptible, the relevant information may be presented to the worker in audible form instead.

Various sensors may be provided in the workspace environment to capture sensor data as the user moves among different workspace locations. Each sensor may be associated with a corresponding workspace location within the workspace environment such that data captured by the sensor may be used to determine a user's proximity to or orientation in relation to the corresponding workspace location. The sensors may include, for example, an image sensor for capturing images of the user or a video feed of the user; sensors that include antennas for receiving Bluetooth™, Near Field Communication (NFC), Wi-Fi™, or other radio frequency signals from a transmitter associated with the user; a Radio Frequency Identification (RFID) interrogator or reader configured to receive an RFID signal from an RFID tag or the like associated with the user; and so forth.

In certain example embodiments, a wearable computing device or other mobile device (e.g., smartphone, tablet, or the like) utilized by the user may be configured to transmit wireless signals to one or more sensors. In such example embodiments, a signal strength of a received signal may be determined and selected as the proximity metric. In other example embodiments, a size of an image of the user may be determined from image data captured by an image sensor, and the image size may be selected as the proximity metric. Thus, in certain example embodiments, a signal strength or a size of an image of the user may serve as a measure of a proximity of a user to a reference location. For example, as the signal strength of a wireless signal received from a transmitter associated with a user decreases, it may be determined that the user is moving farther away from a reference location. Similarly, as the size (e.g., dimensions relative to a view window) of an image of the user decreases, it may be determined that the user is moving farther away from a reference location. In certain example embodiments, the absence of a detectable wireless signal (e.g., a signal strength of zero) or the absence of a detectable image of the user may be used as the proximity metric.

Sensor data captured by sensors in the workspace environment may be received by an information attribute determination (IAD) system that may include one or more computing devices that may, in turn, include one or more processing units. At least a portion of the IAD system may be provided locally at the workspace environment, while in other example embodiments, the IAD system may be provided entirely remotely. One or more sensors may form part of the IAD system (e.g., may be provided as components of one or more computing devices of the IAD system) or may be external sensors configured to communicate with the IAD system via one or more networks.

The IAD system may be further configured to communicate via one or more wired or wireless networks with information output devices located in the workspace environment. The information output devices may include visual output devices (e.g., monitors, screens, etc.) configured to present visual information (e.g., text, graphics, video content, etc.); audio output devices (e.g., speakers) configured to present audible information; tactile output devices (e.g., wearable computing devices, handheld devices, etc.) configured to present tactile or haptic information; and so forth.

The IAD system may receive or otherwise obtain sensor data from one or more sensors provided in the workspace environment. The IAD system may analyze the sensor data to determine a metric indicative of a proximity of the user to a reference location or an orientation of the user in relation to an output device associated with the reference location. As a non-limiting example, the reference location may be any location within a physical region of the workspace environment that corresponds to a particular workspace location, and the output device may be located within the particular workspace location.

In certain example embodiments in which the proximity metric is a signal strength, image size, or the like, a determination may be made as to whether the proximity metric is less than or equal to a corresponding threshold value, e.g., the signal strength is below a threshold value or the image size is smaller than a threshold value, thereby indicating a relatively increased distance between the user and the reference location. If the proximity metric is determined to be less than or equal to the threshold value, one or more attributes of information presented via the output device associated with the reference location may be modified. In certain other example embodiments, modifications to attributes of information presented via the output device may be determined as a continuous function of the proximity metric.

Any of a variety of information attributes may be modified. For example, a size of visual information (e.g., text, graphics, etc.) presented by the output device may be increased. As another non-limiting example, an intensity (e.g., a decibel level) of audible information output by the output device may be increased. The intensity of audible information may be increased by an amount that accounts for signal attenuation that may occur prior to detection of the audible information by the user. Because signal strength, user image size, or the like can be inversely correlated to distance of the user from the reference location, a particular signal strength or user image size may indicate that the user is at a particular distance from the reference location. Thus, the example measures described above may serve to compensate for an otherwise decreased ability on the part of the user to detect information output from the output device due to the user's distance from the reference location.

In certain example embodiments, a signal strength, user image size, or the like may be converted to a corresponding distance based on a stored mapping, algorithm, or the like. The relationship between signal strength or user image size and distance may be linear or non-linear. In those example embodiments in which a distance conversion is performed, the determined distance may be compared to a threshold value. If the distance is greater than or equal to the threshold value, attributes of information presented by an output device associated with the reference location may be modified in accordance with, for example, the illustrative modifications detailed above. In certain other example embodiments, modification to attributes of information presented to the user may be determined as a continuous function of the distance of the user from a reference location.

Further, in certain example embodiments, a distance of a user from a reference location may be determined and selected as the proximity metric without having to first determine a signal strength or image size of an image of the user and perform a distance conversion. For example, a mobile device associated with the user may include a GNSS antenna that may be configured to receive GNSS signals from three or more GNSS satellites carrying time-position information. A location of the mobile device (and thus a location of the user within the workspace environment) may then be triangulated from the received GNSS signals. The mobile device may then transmit the determined location to the IAD system. The GNSS antenna may be configured to receive GNSS signals from any current or planned GNSS such as, for example, the Global Positioning System (GPS), the GLONASS System, the Compass Navigation System, the Galileo System, or the Indian Regional Navigational System.

In certain other example embodiments, an orientation metric indicative of an orientation of a user in relation to an output device associated with a reference location may be determined from sensor data. For example, the IAD system may receive or otherwise obtain image data (e.g., still image data, video data, etc.) captured by an image sensor and analyze the image data to determine a user's orientation with respect to an output device. Any suitable measure of the user's orientation with respect to an output device may be selected as the orientation metric. For example, a vector or other suitable metric that indicates the user's location in three-dimensional space with respect to the output device may be chosen as the orientation metric. In an example embodiment, the vector may be represented as a directed line segment having an origin corresponding to a location of the output device and a terminal point corresponding to the location of the user in three-dimensional space. In this manner, it may be detected when the user is located above or below the output device, or otherwise outside of a direct line of sight or a direct sound path of the output device. In other example embodiments, eye-tracking software, facial recognition algorithms, or the like may be executed to determine an orientation of a user's line of sight with respect to a direct line of sight to the output device. For example, an angular deviation between an angle corresponding to a user's detected line of sight and a reference angle corresponding to a direct line of sight to the output device may be determined and selected as the orientation metric.

After determining a suitable orientation metric, the IAD system may be configured to compare the orientation metric to a threshold value to determine whether to modify one or more attributes of information presented to the user (e.g., an orientation of an output device, selection of a different output device to present information, etc.). The threshold value may be, for example, a threshold deviation from a reference orientation such as a reference angle corresponding to a direct line of sight or direct sound path of the output device. In certain other example embodiments, an orientation of an output device may be determined as a continuous function of the orientation metric. For example, a particular orientation may indicate a particular orientation for an output device. Thus, in certain example embodiments, as a user's orientation increasingly deviates from a reference orientation, an orientation of an output device may be continuously adjusted to compensate for the increased deviation.

If the IAD system determines that the orientation metric meets or exceeds the threshold value, e.g., the user's line of sight is oriented at a relatively large angle with reference to a direct line of sight between the user and the output device, any of a variety of measures may be taken. For example, an orientation of the output device may be modified to reduce the deviation between the orientation metric and the reference orientation to the threshold value or below. As a non-limiting example, if the output device is a monitor configured to present visual information, the monitor may be rotated towards the user. Rotation of the monitor may alter the reference orientation such that a deviation between the user's orientation (as represented by the orientation metric) and the reference orientation is reduced, thereby improving visibility of the information presented on the monitor to the user. As another non-limiting example, if the output device is a speaker or other audio output device, the device may be rotated or otherwise re-oriented such that a deviation between the user's orientation and a direct sound path of the device is reduced. Alternatively, or additionally, an intensity of audible information output from the device may be increased. In still other example embodiments, as previously described, the orientation of an output device or the intensity of audible information output from the output device may be continuously adjusted as a function of the orientation metric.

In other example embodiments, the IAD system may analyze sensor data to determine whether to select a different output device for presenting information to a user. For example, the IAD system may determine a proximity metric or an orientation metric from the sensor data, compare the metric to threshold criteria as described above to determine if the threshold criteria are satisfied, e.g., if the user is closer to a second output device than a first output device, and if so, present at least a portion of information initially presented via the first output device via the second output device instead. As a non-limiting example, if the proximity metric corresponds to a signal strength or user image size at or below a threshold value, or otherwise indicates that the user is at or more than a threshold distance away from the reference location, the IAD system may signal a wearable computing device or other mobile device associated with the user to present at least a portion of information that would have otherwise been presented on an output device at the reference location. Similarly, if the orientation metric meets or exceeds a threshold deviation from a reference orientation, the wearable computing device or other mobile device may be instructed to present information that would have otherwise been presented on the output device at the reference location. In certain example embodiments, the information may be simultaneously presented on both the wearable computing device as well as the output device associated with the reference location such as, for example, if the proximity metric or orientation metrics falls within a transition range of threshold values.

In certain other example embodiments, if a proximity metric or orientation metric determined with respect to a first reference location (or a first output device associated with the first reference location) satisfies corresponding threshold criteria, or otherwise indicates that the user is outside of a threshold tolerance for detecting information output from the first output device, the IAD system may analyze the sensor data to determine proximity metrics or orientation metrics with respect to other reference locations (or other output devices located at the other reference locations). The IAD system may then identify a second output device located at a second reference location such that an associated proximity metric or orientation metric for the user with respect to the second reference location (or the second output device) falls within the threshold tolerance, and may direct the second output device to present information to the user in lieu of or in addition to such information being presented by the first output device. For example, if the IAD system determines that the user is located in closer proximity to the second reference location than the first reference location, or is oriented more towards the second output device than the first output device, the IAD system may present information via the second output device in addition to or in lieu of presenting the information via the first output device.

In certain other example embodiments, the IAD system may be configured to identify one or more user or workspace location attributes from the sensor data and modify attributes of information presented to the user based on the identified attribute(s). For example, the IAD system may analyze image data to determine that the user is wearing protective gloves, in which case, the intensity of haptic information provided to the user via a mobile device may be increased to improve the likelihood that the haptic information is sensed by the user. As another non-limiting example, the IAD system may analyze the image data to determine that the user's line of sight or hearing is obstructed by objects present in the workspace environment, items worn by the user (e.g., headphones, protective eyewear, etc.), or the like, and may modify attributes of information presented to the user accordingly (e.g., increase the size of visual information, increase the intensity of audible information, select a different output device for presenting information, etc.). It should be appreciated that a user's proximity to a reference location or a user's orientation with respect to an output device may be considered attributes of the user as well in certain example embodiments.

In certain other example embodiments of the disclosure, the IAD system may present information in a different detectable form based on an analysis of the sensor data. For example, if a comparison of a proximity metric or an orientation metric to suitable threshold criteria indicates that the user is at or greater than a threshold distance from a reference location or is oriented away from an visual output device at the reference location by more than a threshold deviation, audible information and/or haptic information may be presented to the user in lieu of or in addition to increasing the size of visual information presented by the output device at the reference location. In the above example, the audible information and/or the haptic information may be provided by a different output device than the output device located at the reference location such as, for example, an output device to which the user is more closely located or an output device to which the user is more directly oriented. In certain other example embodiments, information may be presented in two distinct detectable forms simultaneously (e.g., audible information and visual information) such as, for example, if the proximity metric or orientation metric falls within a transition range of threshold values.

In certain other example embodiments, attributes of information presented to a user may be modified in relation to a user's proximity to or orientation with respect to a target location. For example, in order to complete a particular task in a workflow process, a user may be required to move to a particular location within the workspace environment. An intensity, frequency, or the like of audible information and/or haptic information provided to the user may be adjusted based on the user's proximity to or orientation with respect to the target location. For example, the decibel level or frequency of an audible tone may increase as the user moves closer to or orients himself/herself more towards the target location, and vice versa. Similarly, the intensity or frequency of haptic feedback pulses may increase as the user moves closer to or orients himself/herself more towards the target location, and vice versa.

In certain example embodiments, various portions of information presented to a user may be prioritized over other portions of information. For example, a first portion of information presented to a user may be prioritized over a second portion of the information based at least in part on a current or future stage of a workflow process. In such example embodiments, modifying attributes of information presented to a user may include modifying the attributes of the first portion of information in relation to the second portion of information. For example, a workflow process for packing an item for shipment may involve, at a particular stage of the process, obtaining a shipping container from an alternate workspace location than a current workspace location. For ease of explanation, the current workspace location may be referred to hereinafter as a first workspace location and the alternate workspace location may be referred to a as second workspace location.

A first portion of information presented to a user may indicate a particular type of shipping container that should be used. A second portion of information presented to the user may indicate any of a variety of other types of information such as, for example, information identifying characteristics of the item to be shipped, information indicating an expected time of completion of the workflow process, information identifying the status of previous tasks of the process that have been completed, information identifying future tasks of the process to be completed, and so forth.

As the user transitions from the first workspace location to the second workspace location to retrieve the shipping container, a metric indicative of the user's proximity or orientation with respect to a reference location (e.g., the first workspace location or a location within a physical region corresponding to the first workspace location) may be determined. In addition, the information presented to the user may be prioritized based on the current stage of the workflow process. For example, because the current task to be completed involves retrieval of the shipping container, the first portion of the information may be assigned a higher priority (e.g., priority ranking) than the second portion of information. Attributes of the first portion of information may then be modified in relation to attributes of the second portion of information based at least in part on the determined metric and the respective priorities of the first portion of information and the second portion of information. For example, a size, intensity, or the like of the first portion of information may be increased based on the determined metric, and a size, intensity, or the like of the second portion of information may be correspondingly decreased based on the determined metric. Referring to the illustrative example introduced above, the type of shipping container required may be prominently displayed, while the other information initially displayed while the user was located in the first workspace location may be less conspicuously displayed. In certain other example embodiments, the second portion of information may not be presented at all. For example, a visual or audible presentation of the second portion of information may be ceased altogether. As another non-limiting example, the frequency of presentation of the first portion of information may be increased relative to the second portion of information (e.g., an audible presentation of the first portion of information may be repeated first several times before an audible presentation of the second portion of information is initiated). Referring again to the illustrative example introduced above, the type of shipping container that is required may be repeated several times before presenting other information relating to the workflow process).

While certain examples have been presented above to illustrate various example embodiments of the disclosure, it should be appreciated that such examples are not exhaustive. It should further be appreciated that numerous variations, modifications, or enhancements to embodiments described herein as well as additional embodiments beyond those that may be described herein are within the scope of this disclosure. Further, any example contexts (e.g., workspace environments) in connection with which example embodiments may be described are merely illustrative, and it should be appreciated that embodiments of the disclosure are applicable to a variety of contexts.

As a non-limiting example of a variation that is within the scope of the disclosure, a metric determined from sensor data (e.g., a proximity metric, an orientation metric, etc.) may be compared to ranges of values to determine whether and to what extent attributes of information presented to a user should be modified. In certain example embodiments, the extent of the modification of an attribute may correspond to the particular range of values within which the metric falls. More specifically, a metric that falls within a first range of values may result in a corresponding increase in the size of visual information or an intensity of audible or haptic information by a first amount while a metric that falls within a second range of values may result in an increase in the size of visual information or an intensity of audible or haptic information by a second amount. Ranges of values may be of any suitable size, e.g., an infinite number of ranges may correspond to a continuous function for determining information attributes based on a determined metric. A finite number of range values may correspond to a step-wise function for determining information attributes based on a determined metric.

As a non-limiting example, a signal strength within the 40-50 dBu range may result in a smaller increase in the size of visual information than a signal strength within the 30-40 dBu range. In other example embodiments, a binary decision may be made to adjust an attribute by a predetermined amount based on whether the metric satisfies associated threshold criteria. For example, if a signal strength is less than or equal to a threshold signal strength, the size of visual information may be increased by a predetermined amount, and if the signal strength is greater than the threshold signal strength, no modification may be made to the size of the visual information. Further, even in those embodiments in which the amount by which an attribute is adjusted is a continuous function of the metric, the attribute may only be adjusted if the metric is first determined to satisfy threshold criteria (is greater than, less than, or equal to a threshold value).

Example embodiments of the disclosure provide a number of advantages or technical effects. For example, in accordance with example embodiments of the disclosure, attributes of information presented to a user may be modified such that the user's ability to detect the information is not diminished regardless of the user's location or orientation within a physical environment. In addition, more optimal output devices or forms of detectable output may be selected based on the user's location or orientation within the physical environment in order to maintain or enhance the user's ability to adequately detect information output to the user. Accordingly, a user's ability to efficiently complete tasks that may involve movement between multiple disparate locations within a physical environment is maintained or enhanced. In addition, information presented to a user may be prioritized such that attributes of information that are more relevant to a user given a current stage of a workflow process may be adjusted in relation to attributes of information that are less relevant in order to increase the likelihood that the user detects the more relevant information based on the user's proximity or orientation with respect to an output device configured to output the information. It should be appreciated that the above examples of advantages and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Operational Environment and Device Architecture

FIG. 1 is a schematic block diagram of an illustrative operational environment 100 in accordance with one or more example embodiments of the disclosure. The operational environment 100 may include entities, systems, devices, or physical regions located in or forming part of a physical workspace environment as well as, potentially, entities, systems, devices, or physical regions located remotely from the physical workspace environment.

The operational environment 100 may include a user 102 such as a worker required to complete various tasks as part of a workflow process. The physical workspace environment may include a primary workspace location 104 that may correspond to a physical region of the physical workspace environment within which the user 102 performs a majority of tasks of a workflow process. The physical workspace environment may further include one or more secondary workspace locations that the user 102 may transiently occupy as the user 102 performs various tasks of a workflow process. An example secondary location 106 is depicted in FIG. 1. While the locations 104 and 106 may be referred to herein as a "primary workspace location" and a "secondary workspace location," respectively, these terms should not be deemed limiting, and it should be appreciated that the location 104 may be any reference location within the physical workspace environment regardless of the amount of time the user 102 spends in the location 104 or the number of tasks the user 102 performs within the location 104, and similarly, the location 106 may be any other location within the workspace environment that is distinct from the reference location 104 and which the user 102 may transiently occupy. It should further be appreciated that the particular location identified as the reference location may vary depending on the user's current location within the workspace environment or orientation with respect to one or more output devices.

Each location within the workspace environment may include one or more information output devices that may be configured to present any of a variety of forms of information to the user 102. The output devices may include visual output devices (e.g., monitors, screens, etc.) configured to present visual information (e.g., text, graphics, video content, etc.); audio output devices (e.g., speakers) configured to present audible information; tactile output devices (e.g., wearable computing devices, handheld devices, etc.) configured to present tactile or haptic information; and so forth. An example output device 108 is depicted in FIG. 1 as being located in the primary workspace location 104 and an example output device 128 is depicted as being a wearable computing device or other mobile device associated with the user 102. It should be appreciated that the output device 128 may instead be a device that is non-transiently located within the secondary workspace location 106 rather than a device that travels with the user 102. Further, while various devices may be described herein as output devices, it should be appreciated that any output device may, in fact, be an input/output device capable of receiving and processing input received from the user 102.

Various sensors (not depicted in FIG. 1) may also be provided in the workspace environment to capture sensor data as the user 102 moves among different workspace locations. Each sensor may be associated with a corresponding workspace location within the workspace environment such that data captured by the sensor may be used to determine the user's proximity to or orientation in relation to the corresponding workspace location or an output device located therein. For example, the primary workspace location 104 may have one or more sensors associated therewith for capturing data relating to the primary workspace location 104. Similarly, the secondary workspace location 106 may have one or more sensors associated therewith for capturing data relating to the secondary workspace location 106.

The sensors may include, for example, an image sensor for capturing images of the user or a video feed of the user; sensors that include antennas for receiving Bluetooth™, Near Field Communication (NFC), Wi-Fi™, or other radio frequency signals from a transmitter associated with the user; a Radio Frequency Identification (RFID) interrogator or reader configured to receive an RFID signal from an RFID tag or the like associated with the user; and so forth. In certain example embodiments, the wearable computing device 128 or other mobile device (e.g., smartphone, tablet, or the like) utilized by the user 102 may be configured to transmit wireless signals capable of being received by one or more sensors. Further, in certain example embodiments, one or more sensors may be integrated with an output device (e.g., output device 108). For example, the output device 108 may be a computing device that has camera functionality integrated therein, one or more integrated antennas for receiving radio frequency signals, and so forth. In other example embodiments, the sensors may be provided externally from an output device, but may be configured to communicate therewith via one or more wired or wireless connections.

The operational environment 100 may further include an information attribute determination (IAD) system 110 that may include one or more computing devices that may, in turn, include one or more processing units. One or more components of the IAD system 110 (e.g., one or more computing devices) may be provided locally at the workspace environment, while in other example embodiments, the IAD system 110 may be provided entirely remotely. One or more sensors may form part of the IAD system 110 (e.g., may be provided as components of one or more computing devices of the IAD system 110) or may be external sensors configured to communicate with the IAD system 110 via one or more networks (not shown). In addition, one or more output devices (e.g., output device 108) may form part of the IAD system 110 or may be external to the IAD system 110.

The sensors provided in the workspace environment, the output devices provided in the workspace environment, and/or the IAD system 110 (which forms part of the operational environment 100 and which may, at least in part, form part of the workspace environment) may communicate via one or more networks as previously noted. Such networks may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The IAD system 110 may receive or otherwise obtain sensor data from one or more sensors provided in the workspace environment. The IAD system 110 may analyze the sensor data to determine a metric indicative of a proximity of the user to a reference location or an orientation of the user in relation to an output device associated with the reference location. Referring to FIG. 1 more specifically, the IAD system 110 may receive or otherwise obtain sensor data 112A. The sensor data 112A may include data captured by one or more sensors associated with the primary workspace location 104. The sensor data 112A may include for example, image data, data representative of radio frequency signals received from a wearable computing device, other mobile device, RFID tag, or the like associated with the user 102, and so forth.

The IAD system 110 may analyze the sensor data 112A to determine, for example, a proximity metric or orientation metric for the user 102. While completing a given task forming part of a workflow process, the user 102 may be located within or in relative close proximity to the primary workspace location 104. Continuing with the illustrative and non-limiting example introduced above, the user 102 may have completed the task of scanning in an item to be packaged for shipment. Responsive to receipt of the scanned input, information may be presented via the output device 108 providing instructions, guidance, or the like relating to the next task to be completed in the workflow process. The next task may be, for example, constructing the box in which the item will be shipped. Accordingly, the information presented via the output device 108 may relate to performance of the task of constructing the box. A workflow process, such as the example one described above, may specify a predetermined sequence of tasks to be completed, and thus, the information to be presented at any given stage in the process may be determined based on input received indicating a transition from a particular task in the process to a subsequent task. Further, in certain example embodiments, invalid or failed input may also determine the information to be presented to the user. In addition to presenting information relating to current or next task to be completed, various other types of information may be presented such as, for example, information relating to previous tasks that have been completed, information relating to future tasks to be completed, information identifying other characteristics of the workflow process, and so forth.

The information presented via the output device 108 may include visual information 116, audible information 118, or information presented in any other form detectable by the user 102. Continuing with the example described above, the output device 108 may be a visual output device configured to render the visual information 116. While the visual information 116 is illustratively depicted in FIG. 1 as including the textual instruction to "Select Box Type A-1," it should be appreciated that the visual information 116 may include any suitable text, graphics, video content, or the like. The output device 108 may additionally, or alternatively, be configured to generate audible information 118 that may substitute for the visual information 116 or supplement the visual information 116. The visual information 116 and/or the audible information may further include any of a variety of other types of information that may not relate to the current task to be completed as part of the workflow process.

Attributes of the information presented via the output device 108 may be determined by the IAD system 110 based on an analysis of the sensor data 112A. Once determined, the IAD system 110 may transmit data indicative of the attributes 114 to the output device 108 such that the output device 108 presents the information in accordance with the determined attributes 114. In certain example embodiments, the IAD system 110 may determine a proximity metric based on an analysis of the sensor data 112A. The proximity metric may represent a measure of the proximity of the user 102 to the primary workspace location 104. As previously described, the proximity metric may be a signal strength of a wireless signal received by a sensor associated with the primary workspace location 104, a size of an image of a user captured by an image sensor associated with the primary workspace location 104, a distance of the user 102 from a reference location within the primary workspace location 104, or the like. As previously described, the distance may be calculated as a function of signal strength or image size or may be independently determined based, for example, on GPS coordinates of a mobile device associated with the user 102.

In those example embodiments in which the proximity metric is a signal strength, image size, or the like, the IAD system 110 may determine whether the proximity metric is less than or equal to a corresponding threshold value. In those example embodiments in which the proximity metric is a distance of the user 102 from a reference location within the primary workspace location 104, the IAD system 110 may determine whether the distance is greater than or equal to a corresponding threshold value. In the example scenario depicted in the left side of FIG. 1, the user 102 is initially in relatively close proximity to the primary workspace location 104, and thus, the signal strength, image size, or the like is likely to be greater than the corresponding threshold value and the distance is likely to be less than the corresponding threshold value. Accordingly, the attributes 114 may correspond to a predetermined size of the visual information 116 or a predetermined intensity of the audible information 118. In other example embodiments, the attributes 114 may be determined as a continuous or step-wise function of the proximity metric. For example, the proximity metric may map to a particular size of the visual information 116 or a particular intensity of the audible information 118 based on the range of values within which the proximity metric falls.

In certain example embodiments, the information presented by the output device 108 may be prioritized such that the attribute(s) of certain portion(s) of information differ from the attribute(s) of other portion(s) of information based on the determined proximity metric. For example, the size of a portion of the visual information 116 or an intensity of a portion of the audible information 118 relating to a current task in the workflow process may be adjusted in relation to other portions of information output by the output device 108 based on the proximity metric, e.g., increased if the proximity metric indicates that the user's 102 distance from the reference location has increased or decreased if the proximity metric indicates that the user's 102 distance from the reference location has decreased.

In certain example embodiments, the IAD system 110 may determine an orientation metric from the sensor data 112A. The orientation metric may indicate an orientation of the user 102 with respect to the output device 108 and may include any of the example types of orientation metrics previously described. The IAD system 110 may compare the orientation metric to suitable threshold criteria (e.g., a reference orientation of the output device 108) to determine the attributes 114 of the information presented via the output device 108 (e.g., an orientation of the output device 108). In certain example embodiments, the orientation metric may be utilized in lieu of the proximity metric to determine the attributes 114, while in other example embodiments, the orientation metric may be used in conjunction with the proximity metric or not at all. Further, in certain example embodiments, if the proximity metric indicates that the user 102 is in relatively close proximity to a reference location within the primary workspace location 104, the orientation metric may not be determined. As previously described, an orientation of the output device 108 may be determined as a continuous or step-wise function of the orientation metric.

As depicted in the right side of FIG. 1, at any given stage of a workflow process, the user 102 may move from the primary workspace location 104 to a secondary workspace location 106 in order to initiate or complete a particular task of the workflow process. Continuing with the example introduced above, the user 102 may move to the secondary workspace location 106 in order to retrieve the desired box type. Numerous other types of tasks may also require the user 102 to move to a different workspace location. For example, the user 102 may move to a different workspace location to place or remove an item from a conveyor belt, to load or unload an item from a transport vehicle, or for any other suitable reason.

The IAD system 110 may receive sensor data 112B from one or more sensors associated with the secondary workspace location 106. Similar to the sensor data 112A, the sensor data 112B may include image data, data representative of radio frequency signals received from a wearable computing device, other mobile device, RFID tag, or the like associated with the user 102, and so forth.

The IAD system 110 may analyze the sensor data 112B to determine a metric indicative of the user's 102 proximity to a reference location within the secondary workspace location 106 or the user's 102 orientation with respect to the output device 108. The IAD system 110 may then modify the first set of attributes 114 to generate an updated second set of attributes 120 based on the determined metric. As previously noted, the determined metric may be a proximity metric or an orientation metric. Both types of metrics may potentially be determined.

In those example embodiments in which the proximity metric is a signal strength, image size, or the like, the IAD system 110 may determine whether the proximity metric is less than or equal to a threshold value such as a threshold signal strength or threshold image size. If the IAD system 110 determines that the signal strength, image size, or the like is less than or equal to the threshold value—which may imply that the user 102 is at or more than a threshold distance from the output device 108—the IAD system 110 may modify the first set of attributes 114 to generate the second set of attributes 120. Modifications may include, for example, increasing a size of the visual information 122 (e.g., text, graphics, etc.) presented by the output device 108 and/or increasing an intensity (e.g., a decibel level) of audible information 124 output by the output device 108. As previously noted, information attributes may alternatively be modified as a continuous or step-wise function of the determined proximity metric.

Modifications may further include modifying attributes of a first portion of the information presented by the output device in relation to attributes of a second portion of the information. For example, the first portion of information may be prioritized with respect to the second portion of information based on prioritization rules, a prioritization algorithm, or the like that may assign a respective priority to a particular portion of information based, for example, on a current stage of a workflow process. In the illustrative example depicted in FIG. 1, if the current task in the workflow process involves retrieving a particular box type, information indicating the box type (e.g., the first portion of information) may be assigned the highest priority. Attributes of the first portion of the information (e.g., size, intensity, etc.) may then be modified (e.g., increased) relative to attributes of other portions of information. This is illustratively depicted in FIG. 1 as an increase in the size of the text "A-1" in the visual information 122 indicating the box type and the elimination of other less relevant information. These example measures may serve to compensate for an otherwise decreased ability on the part of the user 102 to detect information output from the output device 108 in accordance with the first set of attributes 114.

If the IAD system 110 determines that the orientation metric is greater than or equal to a threshold permissible deviation, any of a variety of potential measures may be taken. For example, an orientation of the output device 108 may be modified to reduce the deviation between the orientation metric and the reference orientation of the output device 108. As a non-limiting example, if the output device 108 is a monitor configured to present visual information, the monitor may be rotated towards the user 102. Rotation of the monitor may alter the reference orientation such that a deviation between the user's orientation (as represented by the orientation metric) and the reference orientation is reduced, thereby improving visibility of the information presented on the monitor to the user. As another non-limiting example, if the output device 108 is a speaker or other audio output device, the device may be rotated or otherwise re-oriented such that a deviation between the user's orientation and a direct sound path of the device is reduced. Re-orienting of the output device 108 may occur in addition to, or as an alternative to, presenting visual information 122 having an increased size and/or presenting audible information 124 having an increased intensity. Further, as previously noted, an orientation of the output device 108 may be a continuous or step-wise function of the determined orientation metric.

In other example embodiments, the IAD system 110 may select a different output device for presenting information to a user based on the determined proximity metric and/or orientation metric. For example, if the proximity metric indicates that the user is at or more than a threshold distance away from the primary workspace location 104, the IAD system 110 may signal a wearable computing device 128 or other mobile device associated with the user 102 to present at least a portion of information that would have otherwise been presented on the output device 108. More specifically, in such example embodiments, the IAD system 110 may instruct the wearable computing device 128 or other mobile device to present information in accordance with a third set of attributes 126. The third set of attributes 126 may specify a form of the information that should be output by the device 128 (e.g., visual, audible, haptic, etc.) as well as other attributes of the information (e.g., size of visual information, intensity of audible information or haptic information, etc.). Accordingly, the information output by the device 128 may include visual output information 130, audible output information 132, and/or haptic output information 134. As previously noted, various attributes of the information 130, 132, or 134 may be adjusted to indicate increasing or decreasing proximity or orientation towards a target location. In addition, the information presented to the user via the device 128 may be determined based on a prioritization of the information initially presented via the output device 108. For example, portion(s) of the information initially presented via the output device 108 that are determined to be more relevant to the user 102 given a current task that the user 102 is attempting to complete may be presented via the device 128 in a more conspicuous or prominent manner than other portion(s) of information. In still other example embodiments, that portion of the information deemed more relevant to the user 102 may be presented via the device 128 and other less relevant information may continue to be presented via the output device 108.

Similarly, if the orientation metric meets or exceeds a threshold deviation from the reference orientation of the output device 108, the IAD system 110 may instruct the wearable computing device 128 or other mobile device to present, in accordance with the third set of attributes, information that would have otherwise been presented on the output device 108. While it has been described that the device 128 may be instructed to present information that otherwise would have been presented to the user via the output device 108, in certain example embodiments, the information may be simultaneously presented on both the device 128 as well as the output device 108 such as, for example, if the proximity or orientation metric falls within a transition range of threshold values.

In addition, in certain other example embodiments, the IAD system 110 may select a device other than the output device 108 or the mobile device 128 associated with the user 102 to present at least a portion of information initially presented via the output device 108. For example, if a proximity metric or orientation metric determined with respect to primary workspace location 104 (or the output device 108) satisfies corresponding threshold criteria, or otherwise indicates that the user 102 is outside of a threshold tolerance for detecting information output from the output device 108, the IAD system 110 may analyze the sensor data 112B to determine a proximity metric and/or orientation metric for the user 102 with respect to the secondary workspace location 106.

In addition, the IAD system 110 may analyze sensor data captured by sensors associated with other workspace locations to determine any number of additional proximity metrics and/or orientation metrics associated with other workspace locations. The IAD system 110 may then identify a second output device (not shown) located within the secondary workspace location 106 (or another workspace location distinct from primary workspace location 104) such that an associated proximity metric or orientation metric for the user 102 with respect to the second output device (or the location in which the second output device is located) falls within the threshold tolerance, and may direct the second output device to present information to the user in lieu of or in addition to such information being presented by the output device 108 and/or the mobile device 128. For example, if the IAD system 110 determines that the user is located in closer proximity to the location of the second output device, or is oriented more towards the second output device than the output device 108, the IAD system 110 may present information via the second output device in addition to or in lieu of presenting the information via the output device 108.

In accordance with certain example embodiments of the disclosure, the IAD system 110 may analyze sensor data to determine one or more user or workplace location attributes, and may adjust attributes of information presented to the user 102, select one detectable form for outputting information over another detectable form, select one output device over another, and so forth based on the user and/or workplace attributes. For example, based on user and/or workplace attributes gleaned from analysis of sensor data, the IAD system 110 may instruct the mobile device 128 to increase the intensity of the audible output 132 and/or the haptic output 134. As another non-limiting example, based on user attributes and/or workplace attributes, the IAD system 110 may select one form of output over another (e.g., instruct the mobile device 128 to present the visual output 130 in lieu of the audible output 132 or the haptic output 134) and/or one output device over another (e.g., instruct the output device 108 to present the visual information 122 in lieu of presenting the visual output 130 on the mobile device 128). As yet another non-limiting example, the IAD system 110 may instruct one output device to present information in one form and another output device to present information in another detectable form (e.g., instruct output device 108 to present the audible information 124 and instruct the mobile device 128 or an output device associated with the secondary workplace location 106 to present the same, similar, or different information as the visual output 130). The determination of the detectable form or the particular output device for presenting information may be based on a prioritization of the information in addition to a determined proximity or orientation metric for the user 102.

While various example scenarios and embodiments of the disclosure have been described with respect to the illustrative operational environment 100 of FIG. 1, it should be appreciated that such example scenarios and embodiments are not exhaustive. Numerous other scenarios and embodiments may occur in connection with the operational environment 100, and numerous variations, modifications, or enhancements to the operational environment 100 are within the scope of this disclosure.

Figure 2:
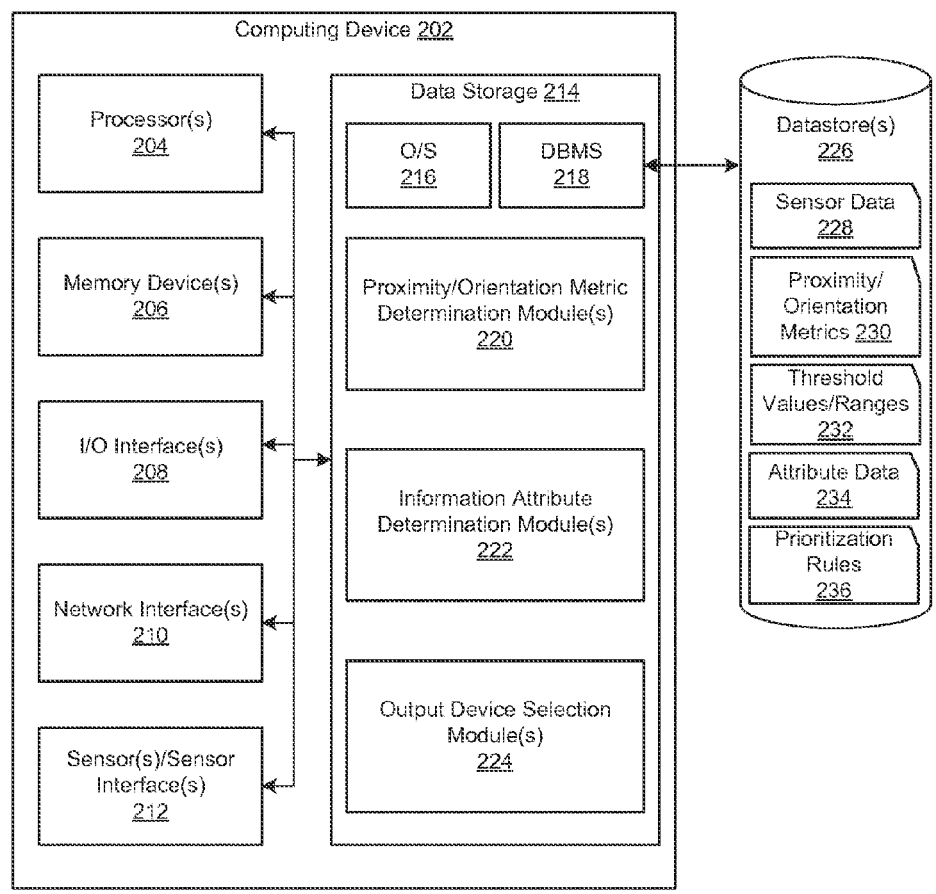
FIG. 2 is a schematic block diagram of an illustrative computing device configured for operation within the illustrative operational environment depicted in FIG. 1 in accordance with one or more example embodiments of the disclosure.

FIG. 2 is a schematic block diagram of an illustrative computing device 202 configured for operation within the illustrative operational environment 100 depicted in FIG. 1 in accordance with one or more example embodiments of the disclosure. The device 202 may form part of, for example, the IAD system 110 and may be located in the physical workspace environment or may be provided remotely therefrom. In certain example embodiments, functionality described as being supported by the device 202 may be distributed across multiple devices. It should be appreciated that FIG. 2 depicts merely an example device configuration and that numerous modifications, variations, or the like are within the scope of this disclosure.

In an illustrative configuration, the computing device 202 may include one or more processors (processor(s)) 204, one or more memory devices 206 (generically referred to herein as memory 206), one or more input/output ("I/O") interface(s) 208, one or more network interfaces 210, one or more sensors and/or sensor interfaces 212, and data storage 214. These various components will be described in more detail hereinafter.

The memory 206 of the computing device 202 may include volatile memory (memory that maintains its state when supplied with power) such as various forms of random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 206 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 206 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 214 may include removable storage and/or non-removable storage including, but not limited to, magnetic storage, optical disk storage, and/or tape storage. The data storage 214 may provide non-volatile storage of computer-executable instructions and other data. The data storage 214 may include storage that is internal and/or external to the computing device 202. The memory 206 and the data storage 214, removable and/or non-removable, are examples of computer-readable storage media (CRSM) as that term is used herein.

The data storage 214 may store computer-executable code, instructions, or the like that may be loadable into the memory 206 and executable by the processor(s) 204 to cause various operations to be performed. The data storage 214 may additionally store data that may be copied to memory 206 for use by the processor(s) 204 during the execution of the computer-executable instructions. Moreover, output data generated as a result of execution of the computer-executable instructions by the processor(s) 204 may be stored initially in memory 206, and may ultimately be copied to data storage 214 for non-volatile storage.

More specifically, the data storage 214 may store one or more operating systems (O/S) 216; one or more database management systems (DBMS) 218; and one or more program modules, applications, or the like such as, for example, one or more proximity/orientation metric determination modules 220, one or more information attribute determination modules 222, one or more output device selection modules 224, and so forth.

One or more datastores 226 may be provided for storing any of a variety of types of data. The datastore(s) 226 may store sensor data 228 captured by various sensors, data 230 indicative of proximity and/or orientation metrics determined from the sensor data 228; data 232 indicative of threshold values/ranges that may be used to determine whether and/or to what extent information attributes should be modified; data 234 indicative of attributes (e.g., size, intensity, etc.) in accordance with which information is to be presented by output devices; data 236 indicative of prioritization rules or the like that may be used to prioritize various types of information with respect to various other types of information, and so forth. The datastore(s) 226 may include any suitable data repository including, but not limited to, databases (e.g., relational, object-oriented, etc.), file systems, flat files, distributed datastores in which data is stored on more than one node of a computer network, peer-to-peer network datastores, or the like. Any of the datastore(s) 226 may represent data in one or more data schemas. Any of the data illustratively depicted as being stored in the datastore(s) 226 may additionally, or alternatively, be stored in the memory 206 and/or the data storage 214.

The DBMS 218 may be loaded into the memory 206 and may support functionality for accessing, retrieving, storing, and/or manipulating data stored in one or more of the datastores 226, data stored in the memory 206, and/or data stored in the data storage 214. The DBMS 220 may use any of a variety of database models (e.g., relational model, object model, etc.) and may support any of a variety of query languages.

The O/S 216 may be loaded from the data storage 214 into the memory 206 and may provide an interface between other application software executing on the computing device 202 and hardware resources of computing device 202. More specifically, the O/S 216 may include a set of computer-executable instructions for managing hardware resources of the computing device 202 and for providing common services to other application programs (e.g., managing memory allocation among various application programs). The O/S 216 may include any operating system now known or which may be developed in the future including, but not limited to, any server operating system, any mainframe operating system, or any other proprietary or non-proprietary operating system.

Referring now to the illustrative program modules depicted as being stored in the data storage 214, the proximity/orientation metric determination module(s) 220 may include computer-executable code, instructions, or the like that responsive to execution by one or more of the processor(s) 204 may cause operations to be performed that include receiving the sensor data 228 as input and performing algorithmic analysis/processing of the sensor data 228 to determine proximity and/or orientation metrics 230. As previously described, one or more sensors associated with a workspace location may be configured to gather data such as image data, radio frequency signal data, and so forth. The sensor(s) may include one or more sensors 212 that are provided as components of the computing device 202 and/or one or more sensors provided external to the computing device 202. The data gathered by such sensors may be provided as input to the proximity/orientation metric determination module(s) 220. The module(s) 220 may further receive as input an identifier associated with a reference location that corresponds to the sensor(s) that gathered the sensor data 228. The identifier may be, for example, position coordinates that identify the reference location within a physical workspace environment. Alternatively, or additionally, the module(s) 220 may receive as input a reference orientation of an output device associated with the reference location.

Computer-executable code or instructions of the module(s) 220 may then be executed to determine a proximity metric and/or an orientation metric based on the sensor data 228 and any additional input(s) that may optionally be received. For example, a signal strength of a radio frequency signal specified in the sensor data may be determined. The radio frequency signal may have been received by a sensor from a transmitter associated with a user (e.g., a mobile device, an RFID tag integrated or otherwise provided in connection with a user's work badge, etc.). In certain example embodiments, the sensor data may directly specify the signal strength, while in other example embodiments, the module(s) 220 may perform processing to determine the signal strength from raw signal data included in the input sensor data.

As another non-limiting example, computer-executable code or instructions of the module(s) 220 may be executed to determine a size of an image of the user from image data included in the sensor data. The size of the image may be any suitable metric capable of identifying the portion of an image (e.g., a still image, a video feed including a series of images, etc.) occupied by at least a portion of the user. Non-limiting examples of metrics that may be used as a measure of the size of an image of the user include the number of pixels used to generate the image of the user, the ratio of the number of pixels used to generate the image of the user to the total number of pixels in the image, the dimensions of the image of the user (e.g., 400 pixels×600 pixels, and so forth). In certain example embodiments, the sensor data may directly specify the size of the image of the user, while in other example embodiments, the module(s) 220 may perform processing to determine the image size from raw image data.

As yet another non-limiting example, computer-executable code or instructions of the module(s) 220 may be executed to determine a distance of the user from a reference location. In certain example embodiments, the module(s) 220 may determine the distance as a function of a determined signal strength or image size. In other example embodiments, the module(s) 220 may calculate the distance based on position coordinates of the reference location and position coordinates (e.g., GNSS coordinates) of a mobile device or the like associated with the user. The GNSS coordinates may have been received from the user's mobile device by a GNSS sensor and may be included in the sensor data.

Computer-executable code or instructions of the module(s) 220 may also be executed to determine orientation metric(s) based on analysis of the sensor data 228. For example, image data, GNSS position coordinates, or the like may be analyzed in relation to a specified reference orientation in order to determine an orientation metric.

The information attribute determination (IAD) module(s) 222 may include computer-executable code, instructions, or the like that responsive to execution by one or more of the processor(s) 204 may cause operations to be performed that include performing, in accordance with any of the techniques disclosed herein, one or more comparisons of a proximity metric and/or an orientation metric to one or more threshold values or threshold value ranges identified from the data 232 to determine attributes 234 in accordance with which information is to be presented by one or more output devices and/or whether existing attributes should be modified and, optionally, the extent to which such attributes should be modified.

For example, if the proximity metric is a signal strength or an image size, the size of visual information presented to the user, the intensity of audible information or haptic information, and so forth may be increased if the proximity metric is less than or equal to a corresponding threshold value. The extent to which the size of the visual information should be increased or the intensity of the audible or haptic information should be increased may be determined based on the range of threshold values within which the proximity metric falls. If the proximity metric is a distance of the user from a reference location, any of the above-described attributes may be increased if the proximity metric is greater than or equal to a corresponding threshold value. Similar comparisons and determinations may be made for an orientation metric in accordance with any of the techniques previously described. Further, information attributes 234 may, in certain example embodiments, be determined as a continuous or step-wise function of a proximity metric and/or an orientation metric. In addition, the attributes of a first portion of information in relation to the attributes of a second portion of information may further be determined based on an application of prioritization rules or the like that prioritize the first portion of information in relation to the second portion of information.

The IAD module(s) 222 may further include computer-executable instructions that when executed by one or more of the processor(s) 204 may cause operations to be performed to select a particular form for outputting information to a user based on a proximity metric, an orientation metric, prioritization rules, other user attributes of a user, and/or workplace attributes. For example, as previously described, if the proximity metric indicates that the user is located at or more than a threshold distance from an output device or an orientation metric indicates that the user is oriented away from the output device by more than a threshold deviation from a reference orientation of the output device, information may be presented in audible rather than visual form. As another non-limiting example, if it is determined that a user's ability to detect a particular output form is obstructed or otherwise limited, information may be presented to the user in an alternate form. Alternatively, information may be presented in the same form but attributes of the information may be modified to enhance the likelihood that the information is detected. As an illustrative and non-limiting example, the intensity of haptic feedback provided to a user via a mobile device may be increased if it is determined that the user is wearing gloves.

The output device selection module(s) 224 may include computer-executable code, instructions, or the like that responsive to execution by one or more of the processor(s) 204 may cause operations to be performed to select, based on a proximity metric, orientation metric, prioritization rules, user attributes, or the like, one or more output devices for presenting information to a user. An output device may be selected in accordance with any of the techniques previously described. For example, if the proximity metric indicates that the user is located at or more than a threshold distance from an output device or an orientation metric indicates that the user is oriented away from the output device by more than a threshold deviation from a reference orientation of the output device, the output device selection module(s) 224 may be configured to select an alternate output device (e.g., a wearable computing device or other mobile device associated with the user) for presenting the information. As another non-limiting example, if a user moves in closer proximity or orients himself/herself more towards a second output device than a first output device, at least a portion of information initially presented by the first output device may be presented by the second output device.

Attribute determinations made as a result of execution of the IAD module(s) 222 may be stored as the attribute data 234. Further, the attribute data 234 and data indicative of output device selections made as a result of execution of the output device selection module(s) 224 may be communicated to appropriate output device(s) to permit rendering of information in accordance with the attribute data 234.

Referring now to other illustrative components of the computing device 202, the processor(s) 204 may be configured to access the memory 206 and execute computer-executable instructions loaded therein. For example, the processor(s) 204 may be configured to execute computer-executable instructions of the various program modules of the computing device 202 to cause or facilitate various operations to be performed in accordance with one or more embodiments of the disclosure. The processor(s) 204 may include any suitable processing unit capable of accepting data as input, processing the input data in accordance with stored computer-executable instructions, and generating output data. The processor(s) 204 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 204 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 204 may be capable of supporting any of a variety of instruction sets.

The computing device 202 may further include one or more input/output (I/O) interfaces 208 that may facilitate the receipt of input information by the computing device 202 from one or more I/O devices as well as the output of information from the computing device 202 to the one or more I/O devices. The I/O devices may include, for example, one or more user interface devices that facilitate interaction between a user and the computing device 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The computing device 202 may be configured to communicate with any of a variety of other systems, platforms, networks, devices, and so forth (e.g., an output device) via one or more of networks. The computing device 202 may include one or more network interfaces 210 that may facilitate communication between the computing device 202 and any such systems, platforms, networks, or devices.

The computing device 202 may further include one or more sensors or sensor interfaces 212. Example sensors 212 may include image sensors, thermal sensors, and so forth. One or more sensors may include one or more antennas for receiving various types of wireless signals. For example, a cellular antenna may be provided for transmitting or receiving cellular signals, a Wi-Fi antenna may be provided for transmitting or receiving Wi-Fi signals, a GNSS antenna may be provided for receiving GNSS signals, a Bluetooth antenna may be provided for transmitting or receiving Bluetooth signals, a Near Field Communication (NFC) antenna may be provided for transmitting or receiving NFC signals, and so forth. One or more of the above types of signals may be received from a mobile device associated with a user.

Although not depicted in FIG. 2, one or more sensors may include transceiver(s) that may include any suitable radio component(s) for—in cooperation with the one or more antennas —transmitting or receiving radio frequency (RF) signals in the bandwidth and/or channels corresponding to the communications protocols utilized by a user's mobile device. The transceiver(s) may include hardware, software, and/or firmware for modulating, transmitting, or receiving—potentially in cooperation with one or more antennas—communications signals according to any of the communications protocols discussed above.

It should be appreciated that the program modules, applications, computer-executable instructions, code, or the like depicted in FIG. 2 as being stored in the data storage 214 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computing device 202 and/or hosted on other computing device(s) accessible via one or more networks may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices of the IAD system 110 in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the computing device 202 may include alternate and/or additional hardware, software, or firmware components beyond those described or depicted without departing from the scope of the disclosure. More particularly, it should be appreciated that software, firmware, or hardware components depicted as forming part of the computing device 202 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 3:
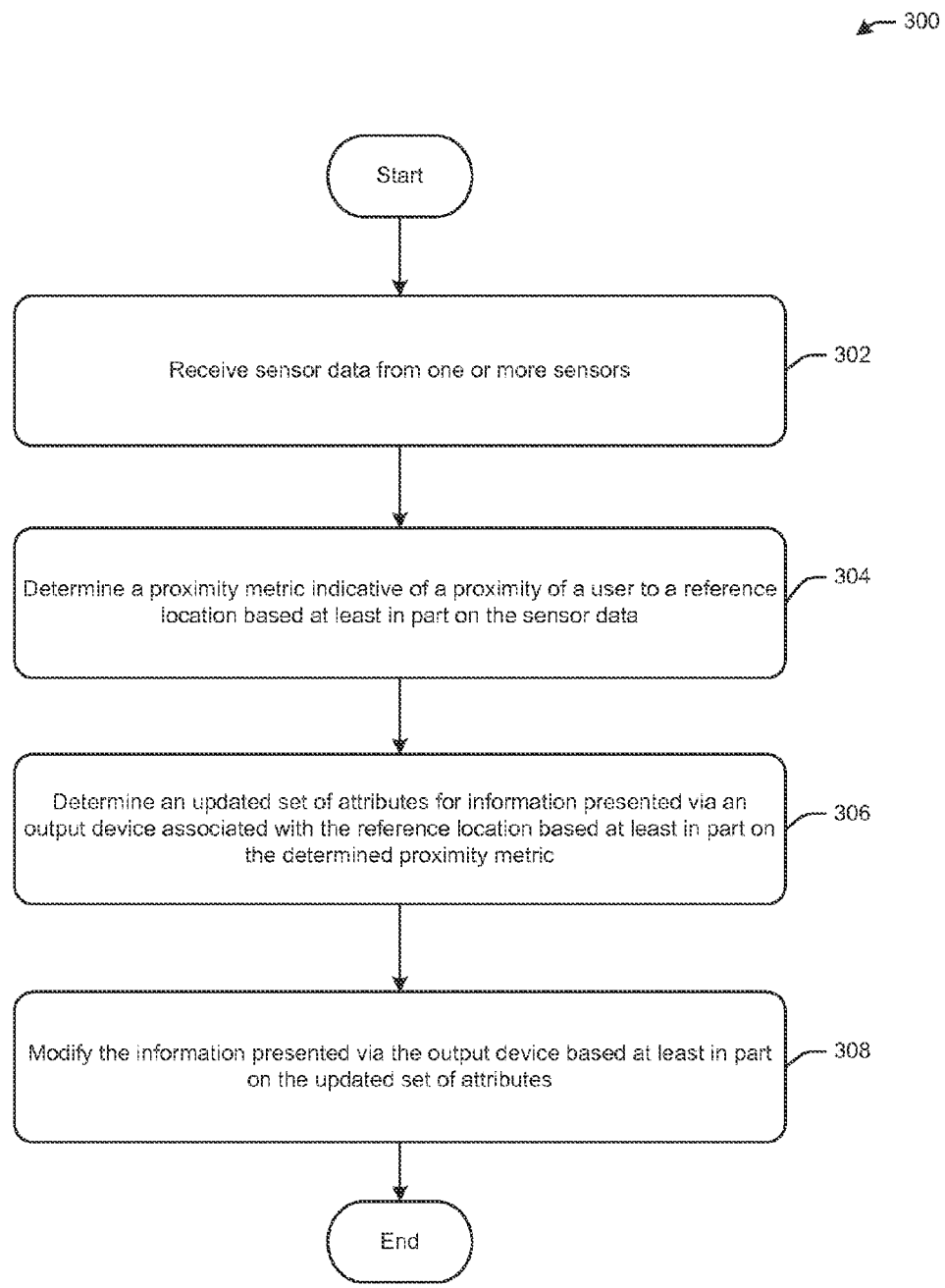
FIG. 3 is a process flow diagram of an illustrative method for modifying one or more attributes of information presented to a user via an output device based at least in part on a proximity metric indicative of a proximity of the user to a reference location in accordance with one or more example embodiments of the disclosure.

FIG. 3 is a process flow diagram of an illustrative method 300 for modifying one or more attributes of information presented to a user via an output device based at least in part on a proximity metric indicative of a proximity of the user to a reference location in accordance with one or more example embodiments of the disclosure.

At block 302, sensor data may be received as input by the proximity/orientation metric determination module(s) 220. The sensor data may include any of the types of data previously described.

At block 304, computer-executable instructions of the proximity/orientation metric determination module(s) 220 may be executed to determine, based at least in part on the sensor data, a proximity metric indicative of a proximity of a user to a reference location. As previously described, the proximity metric may be a measure of the strength of a radio frequency signal received by a sensor, a measure of the size of an image of the user, a distance of the user from the reference location, and so forth.

At block 306, computer-executable instructions of the IAD module(s) 222 may be executed to determine, based at least in part on the proximity metric, an updated set of attributes for information presented via an output device associated with the reference location. In certain example embodiments, a current set of attributes of the information may be modified to the updated set of attributes if the proximity metric indicates that a user is at or greater than a threshold distance from the reference location. In other example embodiments, the updated set of attributes may be determined as a continuous or step-wise function of the proximity metric. In certain example embodiments, the updated set of attributes may include modifying attributes of a first portion of information in relation to attributes of a second portion of information. For example, a size, intensity, or the like of information deemed more relevant to a user based on an application of prioritization rules or the like may be increased, and a size, intensity, or the like of less relevant information may be decreased (or eliminated) as a function of the proximity metric. In still other example embodiments, different content may be selected for presentation to the user based on an application of the prioritization rules and the proximity metric.

From block 306, the method 300 may proceed to block 308 where the information presented via an output device associated with the reference location may be modified based at least in part on the updated set of attributes.

Figure 4:
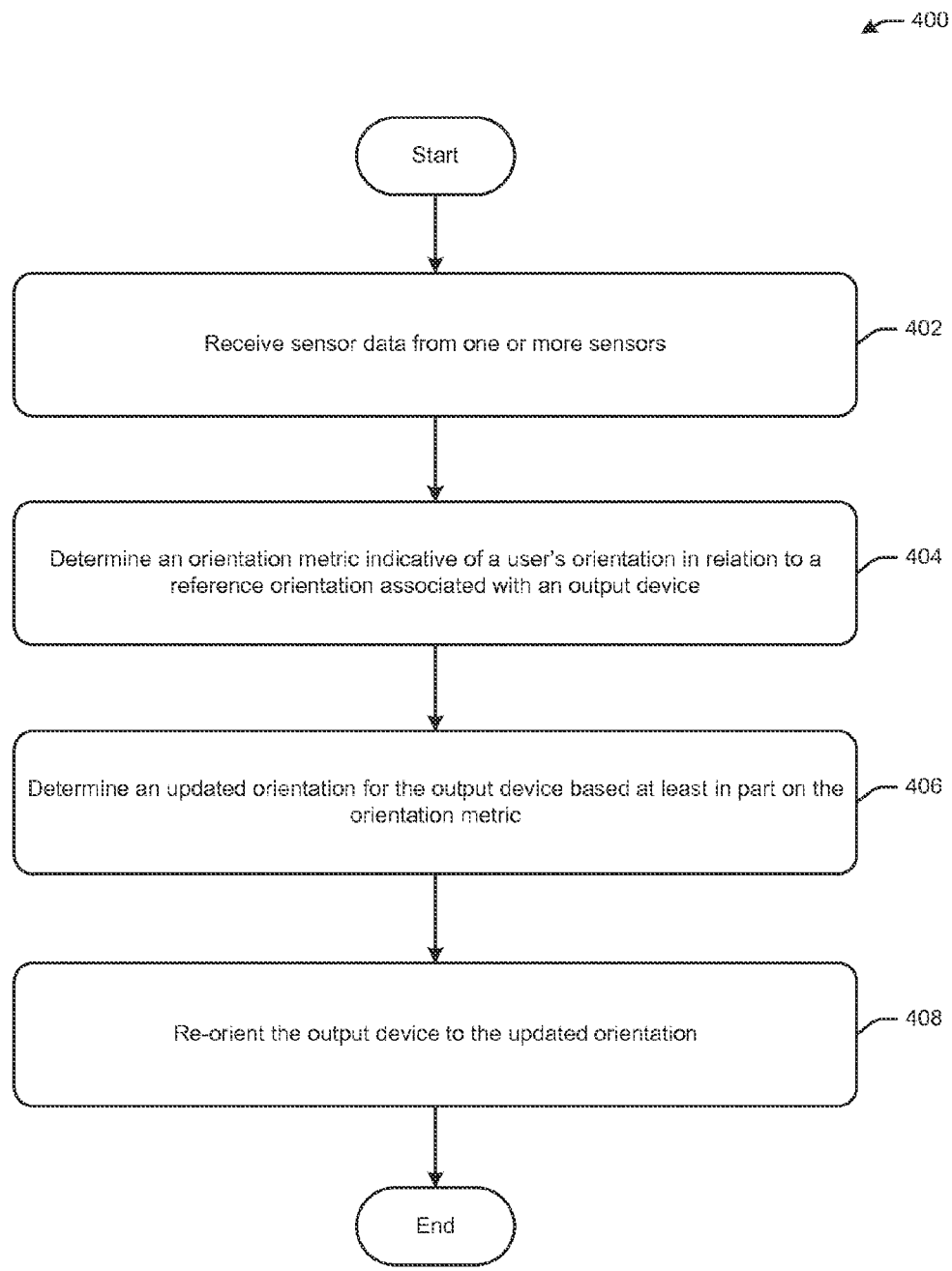
FIG. 4 is a process flow diagram of an illustrative method for modifying an orientation of an information output device based at least in part on an orientation metric indicative of an orientation of a user in relation to the output device in accordance with one or more example embodiments of the disclosure.

FIG. 4 is a process flow diagram of an illustrative method 400 for modifying an orientation of an information output device based at least in part on an orientation metric indicative of an orientation of a user in relation to the output device in accordance with one or more example embodiments of the disclosure.

At block 402, sensor data may be received as input by the proximity/orientation metric determination module(s) 220. The sensor data may include any of the types of data previously described.

At block 404, computer-executable instructions of the proximity/orientation metric determination module(s) 220 may be executed to determine, based at least in part on the sensor data, an orientation metric indicative of an orientation of a user in relation to a reference orientation associated with an output device.

At block 406, computer-executable instructions of the IAD module(s) 222 may be executed to determine, based at least in part on the orientation metric, an updated orientation for the output device. In certain example embodiments, a current orientation of the output device may be modified to the updated orientation if the orientation metric indicates that the user's orientation deviates from the reference orientation by a threshold deviation or more. In other example embodiments, the updated orientation may be determined as a continuous or step-wise function of the orientation metric. In certain example embodiments, modifying the orientation of the output device may include a modifying attributes of a first portion of information in relation to attributes of a second portion of information. For example, a size, intensity, or the like of information deemed more relevant to a user based on an application of prioritization rules or the like may be increased, and a size, intensity, or the like of less relevant information may be decreased (or eliminated) as a function of the orientation metric. In still other example embodiments, different content may be selected for presentation to the user based on an application of the prioritization rules and the orientation metric.

At block 408, the output device may be re-oriented to the updated orientation. The output device may be re-oriented such that a modified orientation metric associated with the user is less than a threshold deviation from the modified reference orientation associated with the output device subsequent to re-orientation. The modified orientation metric may represent an orientation of the user in relation to the modified reference orientation, and the modified reference orientation may represent an optimal orientation in relation to the re-oriented output device.

Figure 5:
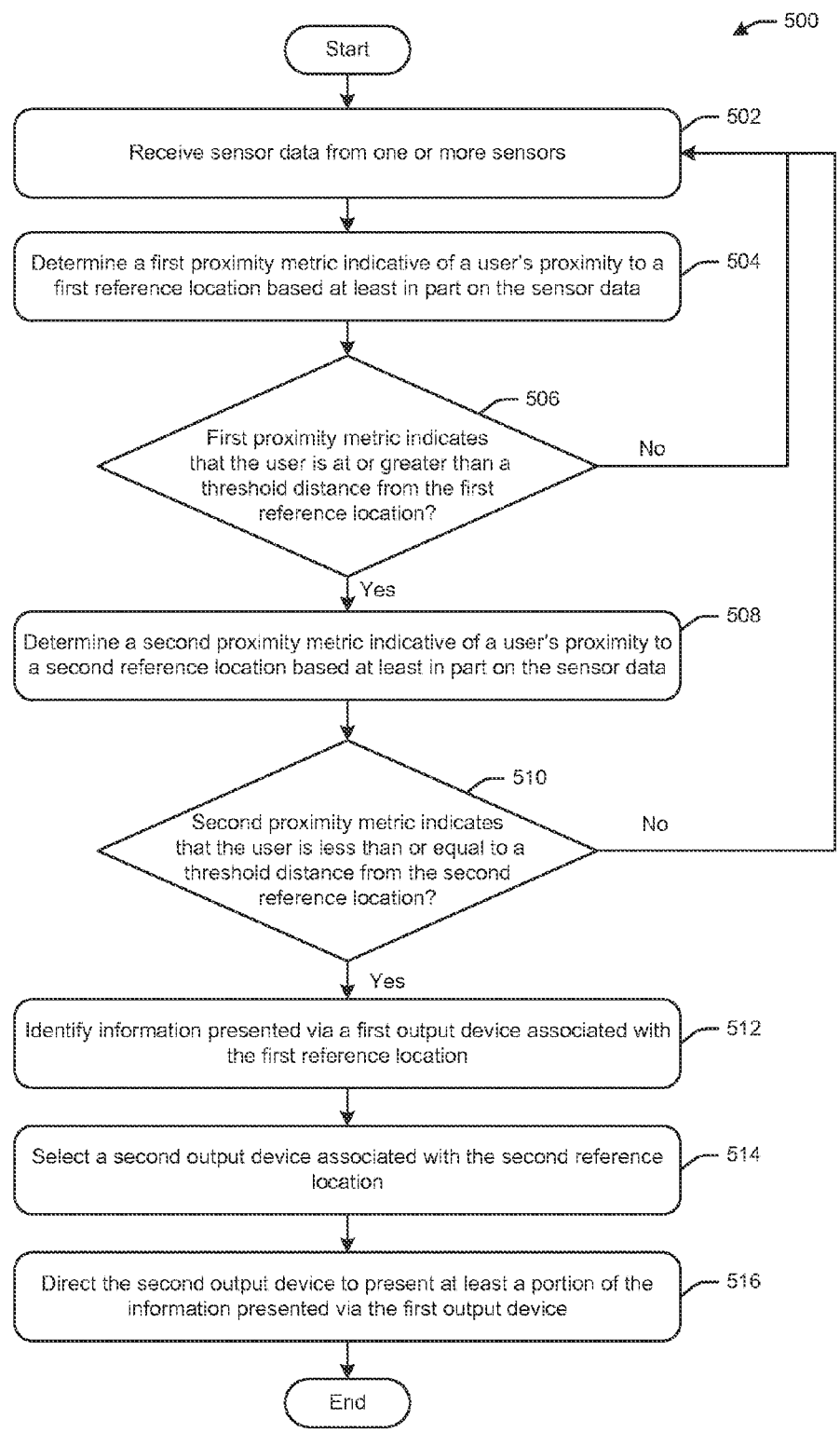
FIG. 5 is a process flow diagram of an illustrative method for selecting an alternative output device for presenting information to a user based at least in part on proximity data in accordance with one or more example embodiments of the disclosure.

FIG. 5 is a process flow diagram of an illustrative method 500 for selecting an alternative output device for presenting information to a user based on proximity data in accordance with one or more example embodiments of the disclosure.

At block 502, sensor data may be received as input by the proximity/orientation metric determination module(s) 220. The sensor data may include any of the types of data previously described.

At block 504, computer-executable instructions of the proximity/orientation metric determination module(s) 220 may be executed to determine, based at least in part on the sensor data, a first proximity metric indicative of a user's proximity to a first reference location. As previously described, the first proximity metric may be a measure of the strength of a radio frequency signal received by a sensor associated with the first reference location, a measure of the size of an image of the user captured by a sensor associated with the first reference location, a distance of the user from the first reference location, and so forth.

At block 506, computer-executable instructions of the IAD module(s) 222 may be executed to determine whether the first proximity metric indicates that the user is at or greater than a threshold distance from the first reference location. The determination at block 306 may involve determining whether the proximity metric is less than or equal to a threshold value or whether the proximity metric is greater than or equal to a threshold value depending on the type of proximity metric that is used. The threshold distance that forms the basis for the comparison at block 506 may be a distance that is judged to be the maximum distance beyond which output of information to the user via an output device associated with the first reference location is not preferred or optimal (e.g., fails to meet minimum criteria for being adequately detected by the user).

In response to a negative determination at block 506, the method 500 may proceed again to block 502. The method 500 may be performed iteratively as additional sensor data is received. On the other hand, in response to a positive determination at block 506, the method 500 may proceed to block 508 where computer-executable instructions of the proximity/orientation metric determination module(s) 220 may be executed to determine, based at least in part on the sensor data, a second proximity metric indicative of the user's proximity to a second reference location.

At block 510, computer-executable instructions of the IAD module(s) 222 may be executed to determine whether the second proximity metric indicates that the user is less than or equal to a threshold distance from the second reference location. The threshold distance that forms the basis for the comparison at block 510 may be a distance judged to be the maximum distance beyond which output of information to the user via an output device associated with the second reference location is not preferred or optimal (e.g., fails to meet minimum criteria for being adequately detected by the user).

In response to a negative determination at block 510, the method 500 may proceed to block 502, and the method 500 may be performed iteratively as additional sensor data is received. Alternatively, one or more additional proximity metrics may be determined in relation to one or more additional reference locations and the operation at block 510 may be performed iteratively for the additional proximity metrics until a proximity metric is identified that results in a positive determination at block 510 or until all such additional proximity metrics are exhausted.

In response to a positive determination at block 510, the method 500 may proceed to block 512 where information presented via a first output device associated with the first reference location may be identified.

At block 514, computer-executable instructions of the output device selection module(s) 224 may be executed to select a second output device associated with the second reference location. The second output device may be an output device with is non-transiently located within a physical region that includes the second reference location. In other example embodiments, the second output device may, in fact, be a mobile device (e.g., a wearable computing device) associated with the user, and which is only transiently associated with the second reference location as a result of the user's proximity to the second reference location.

At block 516, the computing device 202 may communicate an instruction to the second output device to present at least a portion of the information initially presented via the first output device. The information presented via the second output device may be presented in a same detectable form or a different detectable form as the information initially presented via the first output device.

It should be appreciated that numerous variations to the operations of methods 300-500 are within the scope of this disclosure. For example, while method 500 has been described in the context of proximity metrics, it will be appreciated that the operations are equally applicable to orientation metrics. In addition, the method 500 may include simultaneous presentation of the same or different information by the first output device and the second output device such as, for example, if the first proximity metric and/or the second proximity metric fall within transition threshold ranges. Still further, user attributes or workplace attributes may be analyzed to determine whether to modify attributes of information presented by an output device or select a different output device for presenting at least a portion of the information.

One or more operations of the methods 300-500 may be described below as being performed by a computing device 202, or more specifically, by one or more program modules, applications, or the like executing on a computing device 202. It should be appreciated, however, that any of the operations of any of the methods 300-500 may be performed by one or more other components of the IAD system 110, or more specifically, by one or more program modules, applications, or the like executing on such components. In addition, it should be appreciated that processing performed in response to execution of computer-executable instructions provided as part of an application, program module, or the like may be interchangeably described herein as being performed by the application or the program module itself, by a device on which the application, program module, or the like is executing, or by a system that includes such a device. While the operations of the methods 300-500 may have been described in the context of the illustrative operational environment 100 and the computing device 202 having the illustrative configuration depicted in FIG. 2, it should be appreciated that such operations may be implemented in connection with numerous other operational and device level configurations.

The operations described and depicted in the illustrative methods of FIGS. 3-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
    receiving, by one or more computers comprising one or more processors, sensor data from one or more sensors, wherein the sensor data comprises at least one of image data or a signal received from a transmitter associated with a user;
    determining, by the one or more computers and based at least in part on the sensor data, a physical size of an image of the user included in the image data or a signal strength of the signal,
    determining, by the one or more computers, an approximate distance between a location of the user and a reference location based at least in part on the data, wherein determining the approximate distance between the location of the user and the reference location comprises at least one of: (i) correlating the physical size of an image of the user based on the image data captured by a first sensor of the one or more sensors to the approximate distance or (ii) correlating a signal strength of the signal received by a second sensor of the one or more sensors to the approximate distance;
    prioritizing, by the one or more computers, a first portion of information over a second portion of the information to be presented to a user via an output device associated with the reference location;
    modifying, by the one or more computers, one or more attributes of the information to be presented to the user via the output device, wherein modifying comprises increasing at least one of an intensity of an audible output or a displayed size of a visual output of the first portion of information based at least in part on the approximate distance and the prioritization of the first portion of information over a second portion of information; and
    directing, by the one or more computers, presentation of the information to the user via the output device according to the one or more attributes.

2. The method of claim 1, wherein modifying the one or more attributes further comprises decreasing at least one of the intensity of the audible output or the displayed size of the visual output of the second portion of information based at least in part on the approximate distance and the prioritization of the first portion of information over the second portion of information.

3. The method of claim 1, wherein the first portion of the information is prioritized over the second portion of the information based at least in part on a current task of a workflow process.

4. The method of claim 1, wherein modifying the one or more attributes further comprises at least one of: modifying a content of the information to be presented to the user, modifying an orientation of the output device, or selecting a different output device to present at least a first portion of the information.

5. A method, comprising:
    receiving, by one or more computers comprising one or more processors, sensor data from one or more sensors, wherein the sensor data comprises at least one of image data or a signal received from a transmitter associated with a user;
    determining, by the one or more computers and based at least in part on the sensor data, a metric indicative of a proximity of a user to a reference location, wherein the metric is based at least in part on one of a signal strength of the signal received by a first sensor of the one or more sensors from a transmitter associated with the user, or a physical size of an image of the user based on the image data captured by a second sensor of the one or more sensors;
    prioritizing, by the one or more computers, a first portion of information over a second portion of the information to be presented to the user via an output device;
    modifying, by the one or more computers, one or more attributes of the information to be presented to the user based at least in part on the metric and the prioritization of the first portion of the information over the second portion of the information; and directing, by the one or more computers, presentation of a first portion of the information to the user via the output device according to the one or more attributes.

6. The method of claim 5, wherein the first portion of the information comprises at least one of visual information or audible information output from the output device, the method further comprising:
determining, by the one or more computers, that the metric is less than or equal to a threshold value,
wherein modifying the one or more attributes comprises increasing a displayed size of the visual information or increasing an intensity of the audible information responsive to determining that the metric is less than or equal to the threshold value.

7. The method of claim 5, wherein the metric comprises the signal strength of the signal, the first sensor is a radio frequency identification (RFID) interrogator associated with the reference location, and the transmitter is an RFID tag, or the metric comprises the physical size of the image of the user and the second sensor is an image sensor associated with the reference location.

8. The method of claim 5, wherein modifying the one or more attributes further comprises at least one of decreasing a displayed size of a visual output of the second portion of the information, decreasing an intensity of an audible output of the second portion of the information, or ceasing presentation of the second portion of the information, based at least in part on the metric and the prioritization of the first portion of the information over the second portion of the information.

9. The method of claim 5, wherein the metric comprises an approximate distance of the user from the reference location, and wherein the first portion of the information comprises at least one of visual information or audible information output from the output device, the method further comprising:
determining, by the one or more computers, that the approximate distance is greater than or equal to a threshold value,
wherein modifying the one or more attributes comprises increasing a displayed size of the visual information or increasing an intensity of the audible information responsive to determining that the approximate distance is greater than or equal to the threshold value.

10. The method of claim 5, wherein the metric further comprises an orientation metric indicative of the orientation of the user in relation to the output device, the method further comprising:
determining, by the one or more computers, that the orientation metric is greater than or equal to a threshold deviation in orientation from a reference orientation,
wherein modifying the one or more attributes further comprises modifying an orientation of the output device.

11. The method of claim 5, wherein the metric is a first metric, the reference location is a first reference location, the first metric is indicative of the proximity of the user to the first reference location, and the output device is a first output device, the method further comprising:
determining, by the one or more computers, a second metric indicative of a proximity of the user to a second reference location based at least in part on the sensor data;
analyzing the first metric and the second metric to generate an analysis result; and
determining, by the one or more computers, that the user is in closer proximity to the second reference location than the first reference location based at least in part on the analysis result,
wherein modifying the one or more attributes comprises:
identifying, by the one or more computers, a second output device associated with the second reference location; and
directing, by the one or more computers, presentation, via the second output device, of at least the first portion of the information presented via the first output device.

12. The method of claim 11, wherein the first portion of the information is presented via the second output device and the second portion of the information is presented via the first output device.

13. The method claim 11, wherein the second output device is a wearable computing device, and wherein the at least the first portion of the information presented via the wearable computing device comprises haptic information.

14. The method of claim 5, wherein the metric is a first metric, the reference location is a first reference location, the output device is a first output device, and the first metric is indicative of the orientation of the user in relation to the first output device, the method further comprising:
determining, by the one or more computers and based at least in part on the sensor data, a second metric indicative of an orientation of the user in relation to a second output device associated with a second reference location;
analyzing the first metric and the second metric to generate an analysis result; and
determining, by the one or more computers, that a deviation between the orientation of the user in relation to the first output device and a reference orientation to the first reference location is greater than a deviation between the orientation of the user in relation to the second output device and a reference orientation to the second reference location based at least in part on the analysis result,
wherein modifying the one or more attributes comprises:
directing, by the one or more computers, presentation, via the second output device, of at least a portion of the information presented via the first output device.

15. The method of claim 5, wherein modifying the one or more attributes comprises modifying a content of the information to generate modified content based at least in part on the prioritization of the first portion of the information over the second portion of the information and presenting the modified content via the output device.

16. A system, comprising:
at least one memory storing computer-executable instructions; and
at least one processor communicatively coupled to the at least one memory and configured to access the at least one memory and execute the computer-executable instructions to:
receive sensor data from one or more sensors, wherein the sensor data comprises at least one of image data or a signal received from a transmitter associated with a user;
determine one or more attributes of a user based at least in part on the sensor data, wherein the one or more attributes comprise a proximity metric indicative of a proximity of the user to an output device, wherein the proximity metric is based at least in part on one of a signal strength of the signal received by a first sensor of the one or more sensors from a transmitter associated with the user, or a physical size of an image of the user based on the image data captured by a second sensor of the one or more sensors;

prioritize a first portion of information over a second portion of the information presented to the user via the output device based at least in part on the one or more attributes of the user;

modify, by the one or more computers, one or more attributes of the information presented to the user based at least in part on the one or more attributes of the user and the prioritization of the first portion of the information over the second portion of the information; and direct, by the one or more computers, presentation of the information to the user via the output device according to the one or more attributes.

17. The system of claim 16, wherein the information presented to the user comprises haptic information, and wherein the at least one processor is configured to modify the one or more attributes of information by increasing an intensity of the haptic information based at least in part on at least one of the one or more attributes of the user.

18. The system of claim 16, wherein the at least one processor is configured to modify the one or more attributes of the information presented to the user by executing the computer-executable instructions to:

identify a first output device used to present the information to the user;

select a second output device based at least in part on at least one of the one or more attributes of the user; and direct the second output device to present the first portion of the information, and direct the first output device to present the second portion of the information, wherein the first portion of the information presented by the second output device is presented in a different detectable form than the second portion of the information presented by the first output device.

* * * * *